Sept. 7, 1943.　　　E. H. FISCHER　　　2,329,114
COATING CERAMIC ARTICLES
Filed July 24, 1940　　　4 Sheets-Sheet 2

WITNESSES:

INVENTOR
Eugene H. Fischer.
BY
ATTORNEY

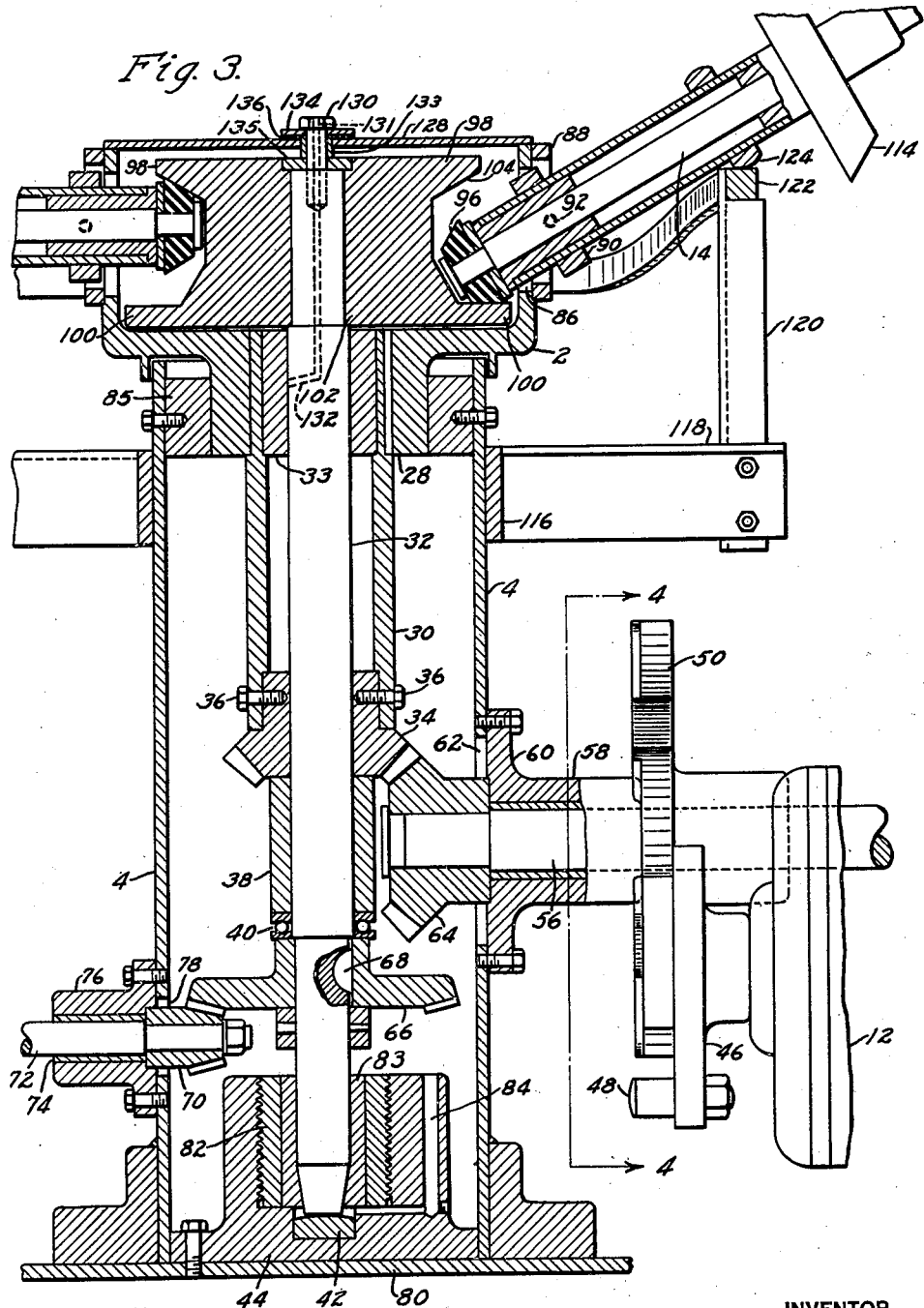

Sept. 7, 1943.  E. H. FISCHER  2,329,114
COATING CERAMIC ARTICLES
Filed July 24, 1940   4 Sheets-Sheet 4
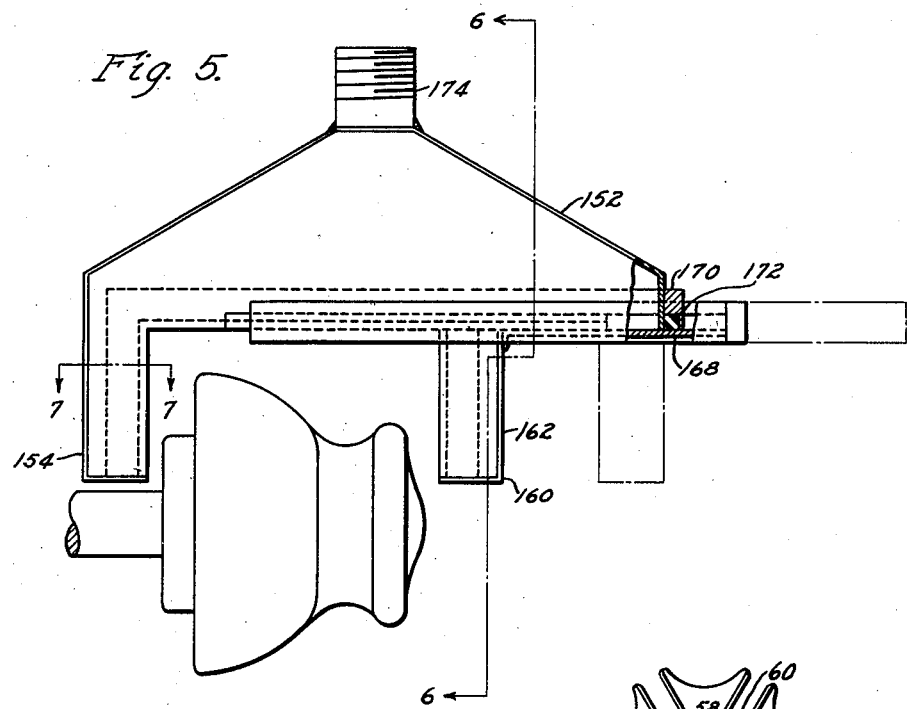
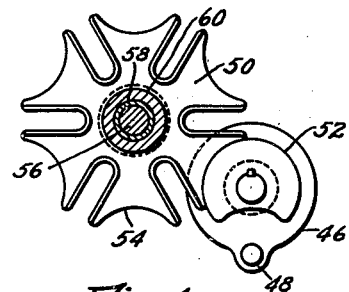
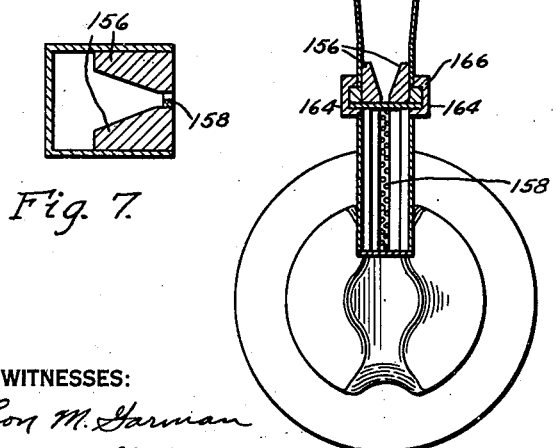
WITNESSES:
Leon M. Garman
David Kreider
INVENTOR
Eugene H. Fischer.
BY
ATTORNEY Patented Sept. 7, 1943

2,329,114

UNITED STATES PATENT OFFICE 2,329,114

COATING CERAMIC ARTICLES

Eugene H. Fischer, Derry, Pa., assignor to Westinghouse Electric & Manufacturing Company, East Pittsburgh, Pa., a corporation of Pennsylvania Application July 24, 1940, Serial No. 347,140

10 Claims. (Cl. 91—44)

The present invention relates to the coating of ceramic articles, and it has particular relation to a method and apparatus for applying a glaze coating to electrical insulators of ceramic material. Although not limited thereto, the invention is especially applicable to the coating of insulators of the pin type.

The usual practice in coating ceramic articles, such as porcelain insulators, has been to place the article on a suitable pin or holder and immerse it in a container filled to a sufficient height with liquid glaze material. Considerable loss has occurred from this method because air is often entrapped on the surface of the article, and although it appears to be completely covered, a number of small bare spots often occur upon firing. This, of course, makes it necessary to repeat the expensive firing operation. Also, in this dip glazing process there has been no suitable way of preventing the glaze from running in streaks, and causing tear-like formations on the lowest drain-off points. These tear-like formations being naturally heavier in coating thickness than is desired, have a tendency to crawl or pull from the thinner glaze and frequently cause bare spots which also necessitate refiring. Further, there is a definite limit to the speed with which articles may be glazed by this method.

Another prior art coating method consists of spraying coating material in an atomized form upon a rotating article. With this method it is extremely difficult to obtain a sufficiently uniform coating over the entire surface, particularly with the so-called pin-type high-tension insulators which have surface creepage flanges of considerable depth. This is due to the surfaces next the atomizing nozzle accumulating more material than those distant from it and to the existence of a turbulent air condition caused by the above mentioned irregular surfaces.

According to the present invention, a particularly uniform coating is obtained by spraying the glazing material while in a liquid form onto the article from a plurality of directions. At the same time the article is rotated to cause the entire exposed surface to be coated. After the liquid material is sprayed thereon the article is moved to a predetermined position at which hot air or some other drying medium is employed in order to sufficiently dry the coating material before removing it from the apparatus. The articles are preferably rotated at a selected speed during the drying operation as well as while being coated in order to prevent the occurrence of tear formations thereon.

It is, accordingly, an object of the present invention to provide a novel and improved method and apparatus for coating ceramic articles.

Another object of the invention is to provide apparatus for applying a uniform coating of glaze material to ceramic articles.

It is another object of the invention to provide improved apparatus for automatically applying a complete and uniform coating of glaze on a pin-type electrical insulator.

A further object of the invention is to provide a novel and improved nozzle for applying coating material to a ceramic article.

Other objects and advantages of the invention will appear from the following detailed description taken in conjunction with the accompanying drawings, in which:

Fig. 3 is a view principally in vertical section of a portion of the apparatus of Figs. 1 and 2;

Fig. 4 is an elevational view taken along the line 4—4 of Fig. 3 at a reduced scale of the intermittent driving mechanism employed;

Fig. 5 is an elevational view at an enlarged scale of the spray nozzle shown in Fig. 2;

Fig. 6 is a sectional view taken along the line 6—6 of Fig. 5; and

Fig. 7 is a sectional view taken along the line 7—7 of Fig. 5.

Figure 1:
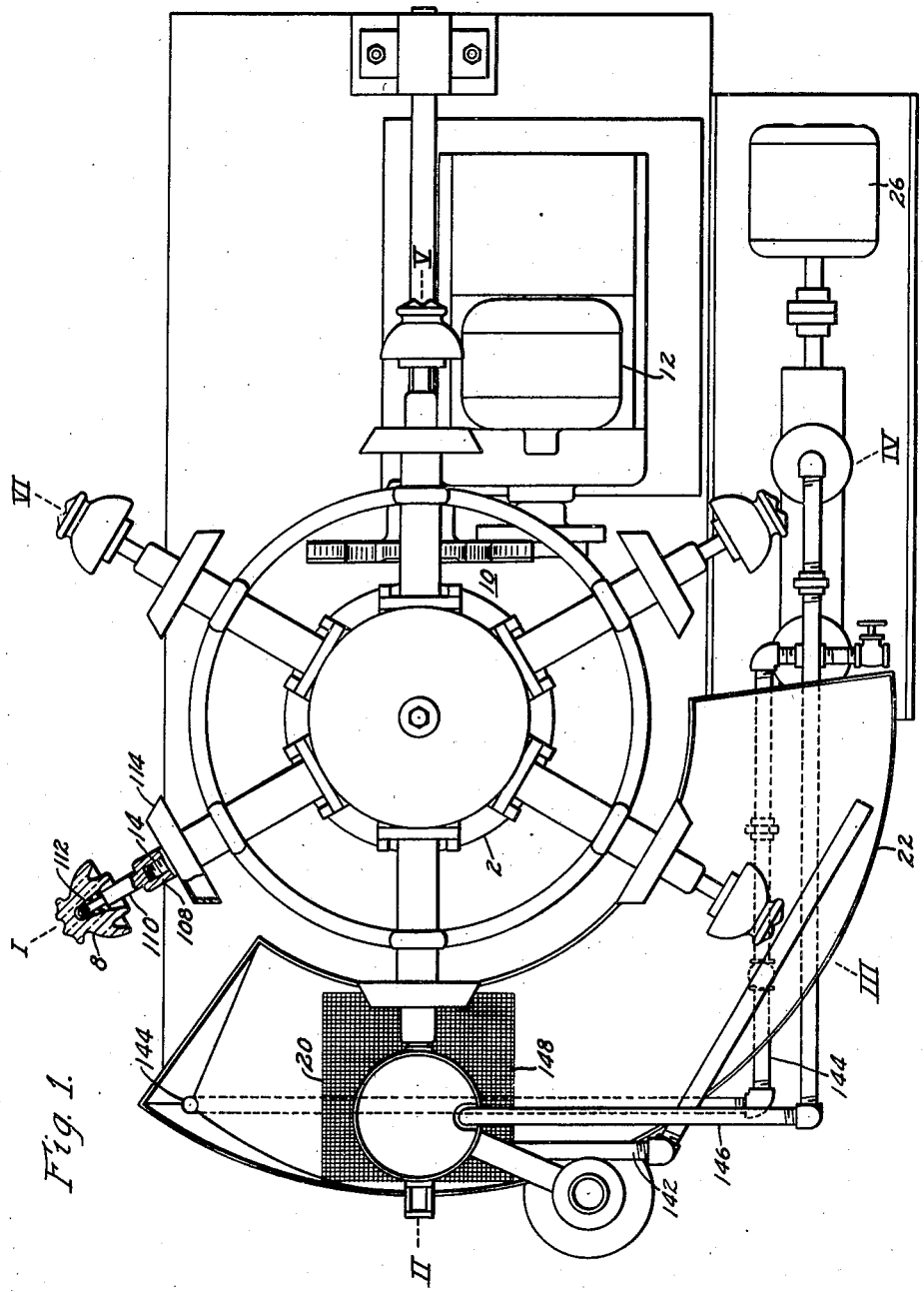
Figure 1 is a plane view with parts in section of apparatus for performing the invention.
Figure 2:
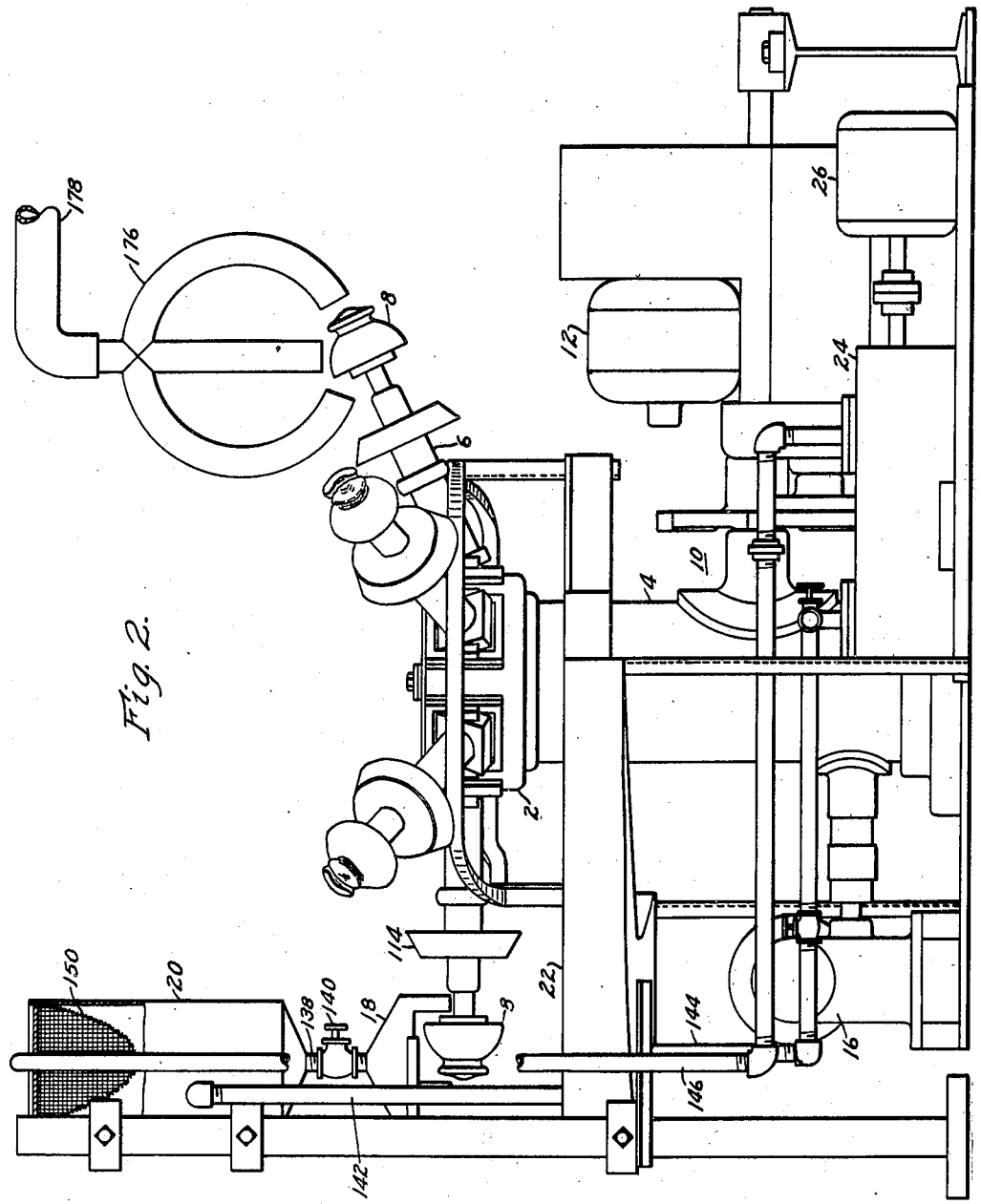
Fig. 2 is a side elevational view of the apparatus of Fig. 1.

Referring to Figs. 1 and 2, the apparatus consists generally of an index head 2 mounted on a vertical column 4 and supporting angularly displaced arms 6 carrying insulators 8. The index head is arranged for intermittent rotation in a horizontal plane through an intermittent driving arrangement 10 which is driven by a synchronous motor 12. Spindles 14 within the arms 6 are arranged to be rotated while at various positions by means of another synchronous motor indicated at 16. A spray nozzle 18 is disposed at a position II which is one of positions I through VI to which each of the arms 6 is successively moved through the intermittent rotation of the index head 2. This nozzle 18 is shaped to partly surround the insulator 8 at this position and spray thereon liquid coating material which is supplied from a receptacle 20. A semi-circular trough indicated at 22 is disposed under the nozzle 18 and suitable piping is provided between the receptacle 20, trough 22, and a pump 24 to maintain the coating material under continuous agitation as will be described in detail later. A motor is provided at 26 to drive the pump 24.

Having particular reference to Fig. 3, the index head 2 is keyed as at 28 to a drive tube 30 which surrounds a vertical shaft 32. On the inside at its upper end, this tube 30 supports a bearing 33 for the shaft 32. A bevel driving gear 34 is secured to the lower end of the tube by means of bolts 36 and is free to rotate with respect to the shaft 32. A gear spacing sleeve 38 which is supported from the shaft 32 through a bearing 40 in turn supports the gear 34 and the remainder of the aforementioned index head driving connections. The lower end of the shaft 32 is seated upon a steel bearing disk 42 which is disposed within a bearing box 44.

The intermittent driving arrangement 10 includes a driving disk 46 which is connected for rotation by the synchronous motor 12. A driving pin 48 is mounted on this disk for engagement between the spokes of an intermittent or Geneva gear 50 to rotate it a sixth of a revolution during a portion of each revolution of the disk. As is best shown in Fig. 4, the driving disk 46 also includes a cam shoe 52 which is disposed to engage a curved outer surface 54 of the intermittent gear 50 while the driving pin is out of engagement therewith to prevent any accidental movement at that time. A shaft 56 is driven from the gear 50 and seated within a bushing 58 in a bushing casing 60 which is secured to the vertical casing 4. This shaft passes through an opening 62 within the casing 4 and carries a bevel gear 64 which engages the index head driving gear 34.

A driving gear 66 is keyed to the spindle or shaft 32 at 68 and engages another bevel gear 70 which is driven by the motor 16 through shaft 72. The shaft 72 is seated within a bushing 74 in a bushing casing 76. The casing 76 is secured to the main or vertical casing 4 around an aperture 78 therein.

The vertical casing 4 and the bearing box 44 which is disposed therein are both firmly attached to a base member 80 in any suitable manner. In addition to supporting the shaft 32 relative to the base the bearing box 44 also defines an internally screw threaded well for receiving a bearing plug 82. This bearing plug maintains bearing material 83 in contact with the lower end of the shaft while oil holes are provided in the bearing box at 84 to facilitate oiling the relatively movable surfaces.

The index head 2 which is disposed within a bushing 85 secured to the upper end of the casing 4 is provided with a plurality of apertures 86, six of which are shown. A trunnion body 88 is mounted on the index head around each of the apertures while an arm 6 extends therethrough. Each of these arms has a trunnion ring 90 secured thereto near its inner end and a horizontal trunnion pin 92 connects the trunnion body 88 and ring 90 to support the arm in a position pivotal in a vertical plane. Within the arm is disposed the spindle 14 to the inner end of which is secured a driving cone 96 which is preferably of rubber and which is disposed between flanges 98 and 100 of a spindle driver 102 secured to the upper end of shaft 32 for movement therewith. The inner surfaces 104 and 106 of the flanges 98 and 100, respectively, are preferably roughened and disposed for selective engagement by the spindle cone 96, depending upon the vertical position of the arm and spindle.

As is shown in Fig. 1, the outer end of each of the spindles is screw-threaded at 108 to receive an adapter 110 which preferably includes a rubber gripping insert 112 at its end. This rubber gripping insert is of such a size that it may be inserted into the pin hole of the insulator 8. A spindle splash guard 114 which is preferably made of sheet metal is inserted between the arm 6 and the adapter 110, as shown.

A track support ring 116 is secured to the vertical casing 4 and includes a plurality of arms 118 to which are bolted vertical supports 120. These supports carry a track member 122 against which a ring 124 on the arm 6 is adapted to rest. The purpose of this track member is to control the vertical position of the arms and consequently the driving of the spindle 14 in accordance with the angular position of the arms in the horizontal plane. Thus, at position I of Fig. 1, the height of the track is such that the cone 96 is completely out of engagement with the spindle driver 102 so that the insulator is not rotated. However, at position II, the track is lower and permits the arm to assume a horizontal position whereby the driving cone engages the upper driving surface 104 of the spindle driver to rotate the spindle. The track rises between positions II and III to incline the spindle upwardly at an acute angle to cause the spindle cone to engage the lower driving surface 106 at this latter position. The track may be of this same height throughout its length from this position to a location past position V at which it lowers again to its original height to disengage the driving cone completely from a spindle driver.

On the open top of the index head 2 is disposed a cover 128 having a central aperture through which a bolt 130 extends into the shaft 32. This bolt has therein an axial hole 131 which communicates with a passage 132 in the shaft 32 to permit oiling of the vertical shaft bearing 33. A spacer member 133 is provided between a pair of washers 134 and 135 while a sealing gasket 136 is disposed between the cover 128 and the outer washer 134.

As is best shown in Fig. 2, a pipe 138 extends from the bottom of the receptacle 20 to the spray nozzle 18 to supply the coating composition thereto. In this pipe is located a valve 140 for controlling the flow of liquid therebetween. A bypass pipe indicated at 142 extends from the receptacle 20 to the interior of the trough 22 while a drain pipe 144 extends from the lowermost point in the trough to the pump 24. From this pump, in turn, a supply pipe 146 passes to the upper end of the receptacle 20. A relatively coarse removable screen 148 (in Fig. 1) is preferably placed within the trough 22 at a point just below the spray nozzle 18 to filter out foreign material from the insulators which might otherwise enter the pumping system. Another and preferably finer screen 150 is located in the receptacle 20 to further screen the returning material.

The spray nozzle itself which is best shown in Figs. 5, 6 and 7 includes a main tubular body portion 152 having a downwardly extending end at 154. This tubular portion is open at its bottom and inner surfaces and nozzle inserts indicated at 156 are placed therein to define a continuous opening into which are placed opening strips 158 to provide the staggered openings shown. In order to permit adjustment of the nozzle to suit various sizes of insulators, an adjustable arm 160 is secured to the horizontal portion of the main body member therealong. This arm includes a portion 162 which is similar to the portion 154 and onto which are secured channels 164 engaging channel guides 166 along the horizontal portion of the main tube. A closing strip 168 extends between the channels 164 on the outside of the movable arm to close the apertures in the horizontal portion of the nozzle which is not between the arms 154 and 162. In order to seal the main body portion at its adjustable end a member 170 is secured thereto to support a sealing gasket 172 in position against the closing strip. A threaded pipe fitting 174 communicates with the body of the nozzle to provide a fluid inlet.

At arm positions indicated by III, IV and V, in Fig. 1, it is preferred to provide a blower nozzle 176 to cause rapid movement of hot air over the insulators while at these positions. These nozzles, only one of which is shown, on the drawings for simplicity, communicate through a pipe 178 with a hot air blower. If preferred, some other drying medium, such as lamps, producing infra-red rays may be employed in lieu of the hot air blowers.

With the foregoing description in mind, the operation of the apparatus may be described as follows: With the motors in operation the index head 2 will be intermittently driven to place the arms 6 at each of the positions I through VI in succession, while permitting them to remain stationary at each of these positions for a period of time which may be adjusted. At the same time the spindles and spindle adapters will be rotated at some of these positions as previously described. Thus, in using the machine the operator will place an insulator 8 on the adapter at the position I at which time the spindle is not rotating. Intermittent driving mechanism will then cause the same arm to move to position II at which the insulator will remain under the nozzle 18 for a predetermined time, while undergoing rotation to cause the coating material to completely cover it. Upon movement of this same arm to position III, the insulator will be tilted upwardly to facilitate draining deep skirts as previously described and will be contacted by the drying air from the dryer nozzle 176. At the same time the insulator is being rotated so that the drying action will be uniform. At positions IV and V the insulator will undergo the same drying treatment as at position III, while upon movement from position V to VI, the arm is moved downwardly but not to the horizontal position. Thus, at position VI the insulator is not being rotated and may be conveniently removed from the machine by the operator.

During this time liquid coating material is passing from the receptacle 20 to the nozzle 18 from which it pours from the bottom and sides onto the side and ends of the insulator in the corresponding position. At the same time material is flowing through the bypass pipe 142 into the casing and this material, along with that dripping from the insulator, is continuously pumped back into the upper part of the receptacle. In this manner any dirt which may be washed off of the insulator or which may get into the material in any manner is continuously screened, filtered out while at the same time the constant agitation acts to keep the mixture completely uniform.

It will be evident that the period of time during which the spraying of the particular insulator takes place may be adjusted to that found most desirable and that likewise the rate of spraying may be controlled through the valve 140. In addition, the speed of rotation of the spindles may be adjusted to that found most desirable so that complete control over the results may be obtained. By substituting spindle adapters having different size ends and by making a simple adjustment of the position of the movable arm on the spray nozzle the apparatus may be readily adapted to handle articles of different sizes and designs.

From the foregoing description it will appear that the present invention provides a method and apparatus for rapidly and efficiently providing ceramic articles, and especially insulators, with a complete and uniform coating of material. Since the coating material is sprayed in liquid form over the uppermost parts of the articles a thorough coating is insured. The washing action of the material not only eliminates foreign matter from the surface being coated but also prevents any air particles from being trapped thereon. The apparatus rotates the articles during drying to further insure that no beads of thick coating occur and the articles are dried sufficiently while on the machine so that no damage is done by handling during the removing operation. The invention has particular utility for coating pin type insulators since the pin holes, on the interior of which the regular glaze coating is not desired, offer a convenient means for securing the insulators onto the apparatus.

Since numerous modifications of the invention will appear to those skilled in the art, it is intended that it shall be limited only by the appended claims interpreted in view of the prior art.

I claim as my invention:

1. In combination, a rotatable casing, means for driving said casing, a plurality of rotatable arms, means securing said arms to said casing in angularly displaced radial relationship for pivotal movement relative to the plane of rotation of said casing, a rotatable member disposed in said casing and having an annular flat driving surface substantially parallel to the plane of rotation of said casing, means for driving said rotatable member, a driving member secured to the inner portion of each of said arms and disposed adjacent said driving surface for selective engagement therewith in accordance with the pivotal position of the arms to rotate said arms, means for supporting articles to be coated on the outer portions of said arms for rotation therewith, and a cam device for controlling the pivotal position of said arms in accordance with the rotary position of said casing.

2. In a coating device, a rotatable casing, means for driving said casing, a plurality of rotatable arms, means securing said arms to said casing in angularly displaced radial relationship for pivotal movement relative to the plane of rotation of said casing, a rotatable member disposed within said casing and having a pair of displaced annular driving surfaces, means for driving said rotatable member, a driving member secured to the inner portion of each of said arms and disposed between said driving surfaces for selective engagement therewith in accordance with the pivotal position of the arms to rotate said arms in corresponding opposite directions, means for supporting articles to be coated on the outer portions of said arms for rotation therewith, and a cam device for controlling the pivotal position of said arms in accordance with the rotary position of said casing.

3. In a coating device, a casing rotatable in substantially a horizontal plane, means for driving said casing, a plurality of rotatable arms, means for securing said arms to said casing in angularly displaced radial relationship for pivotal movement in substantially a vertical direction, a horizontally rotatable member disposed in said casing and having a pair of vertically displaced annular driving surfaces, means for driving said rotatable member, a driving member secured to the inner end of each of said arms and disposed between said driving surfaces for selective engagement with either of said driving surfaces or disengagement therewith in accordance with the vertical position of the arms to control the rotary movement thereof, means for supporting articles to be coated on the outer end of said arms for rotation therewith, and a cam device supporting said arms in pivotal positions differing in accordance with their radial positions.

4. In a coating device, a rotatable casing, means for driving said casing, a plurality of rotatable arms, means securing said arms to said casing in angularly displaced radial relationship for pivotal movement relative to the plane of rotation of said casing, means for intermittently driving said casing to bring each of said arms in sequence to a plurality of predetermined rotary positions, a horizontally rotatable member disposed in said casing and having a pair of annular driving surfaces displaced from each other in the direction of the axis of rotation thereof, means for driving said rotatable member, a driving member secured to the inner end of each of said arms and disposed between said driving surfaces for selective engagement with either of said surfaces or disengagement therewith in accordance with the pivotal position of the arms to control the rotary movement thereof, means for supporting articles to be coated on the outer portions of said arms for rotation therewith, and cam means for controlling the pivotal location of said arms in accordance with the rotary position thereof to maintain each arm stationary in one of said predetermined positions and rotating in opposite directions while in each of two other of said predetermined positions.

5. In a coating device, a rotatable casing, means for driving said casing, a plurality of rotatable arms, means securing said arms to said casing in angularly displaced radial relationship for pivotal movement relative to the plane of rotation of said casing, a rotatable driving member disposed in said casing to rotate about substantially the same axis thereof, said driving member having an annular groove in its edge to form a pair of annular driving surfaces displaced from each other along the axis thereof, a driving wheel at the inner end of each arm disposed between said driving surfaces for selective engagement therewith in accordance with the pivotal position thereof, and cam means for controlling the pivotal position of said arms in accordance with the axial position thereof.

6. In a coating device, a casing rotatable in substantially a horizontal plane, means for driving said casing, a plurality of arms each of which includes a shaft rotatable within a sleeve member, means securing the sleeve members of said arms to said casing in angularly displaced radial relationship for pivotal movement relative to the plane of rotation of said casing, a rotatable driving member disposed in said casing for rotation about substantially the same axis of rotation, said driving member having an annular groove in its edge to form a pair of annular driving surfaces displaced from each other along the axis thereof, a driving wheel at the inner end of each arm disposed between said driving surfaces for selective engagement therewith in accordance with the pivotal position thereof, means for supporting articles to be coated on the outer ends of said arms for rotation therewith, and a cam device supporting said arms in pivotal positions differing in accordance with their radial positions.

7. In a coating device, a casing rotatable in substantially a horizontal plane, a plurality of arms each of which includes a shaft rotatable within a sleeve member, means securing the sleeve members of said arms to said casing in angularly displaced radial relationship for pivotal movement relative to the plane of rotation of said casing, means for intermittently rotating said casing to bring each of said arms in succession to a plurality of predetermined positions, a driving member disposed within said casing for rotation about substantially the axis of rotation thereof, said driving member having an annular groove in its edge to form a pair of annular driving surfaces displaced from each other along the axis thereof, a driving wheel at the inner end of each arm disposed between said driving surfaces for selective engagement therewith in accordance with the pivotal position thereof, means for supporting articles to be coated on the outer ends of said arms for rotation therewith, and a cam device for controlling the pivotal position of each arm in accordance with its radial position to bring each driving wheel into engagement with a first of said driving members in one of said predetermined radial positions, in contact with the other said driving wheels in another of said predetermined positions and out of engagement with both driving members when in a third position.

8. In combination, a rotatable casing, a tubular driving member secured to said casing about its axis of rotation, means for driving said tubular member to rotate said casing, a plurality of rotatable arms, means supporting said arms on said casing in angularly displaced radial relationship for pivotal displacement relative to the plane of rotation of said casing, a rotatable member disposed in said casing for rotation about its axis and having an annular driving surface substantially parallel to the plane of rotation of said casing, a rotatable shaft extending through said tubular driving member for driving said rotatable member, a driving member secured to the inner portion of each of said arms and disposed adjacent said driving surface for selective engagement therewith in accordance with the pivotal position of the arms to rotate them, means for supporting articles to be treated on the outer portions of said arms for rotation therewith, and a cam device for controlling the pivotal position of said arms in accordance with the rotary position of said casing.

9. In combination, a casing rotatable in substantially a horizontal plane, a plurality of arms each of which includes a shaft rotatable within a sleeve member, means securing the sleeve members of said arms to said casing in angularly displaced radial relationship for pivotal movement relative to the plane of rotation of said casing, a tubular driving member secured to said casing about its axis of rotation, means driving said tubular member for intermittently rotating said casing to bring each of said arms in sequence to a plurality of treating positions, a rotatable member disposed in said casing for rotation about substantially the same axis and having a pair of vertically displaced annular driving surfaces at its outer edge, means for driving said rotatable member, a driving wheel secured to the inner end of each of said arms shafts and disposed between said driving surfaces for selective engagement therewith in accordance with the pivotal position of the corresponding said arm, means for supporting an article to be treated on the outer end of each arm for rotation with the shaft thereof, and a cam device for controlling the pivotal position of said arms in accordance with the treating positions at which they are disposed.

10. In a coating device, a casing rotatable in substantially a horizontal plane, a plurality of arms each of which includes a shaft rotatable within a sleeve member, means securing the sleeve members of said arms to said casing in angularly displaced radial relationship for pivotal movement in a vertical plane, a tubular driving member secured to said casing about its axis of rotation, means driving said tubular member for intermittently rotating said casing to bring each of said arms in sequence to a plurality of working positions, a rotatable member disposed in said casing for rotation about substantially the same axis and having a pair of vertically displaced annular driving surfaces at its outer edge, means for driving said rotatable member, a driving wheel secured to the inner end of each of said arm shafts and disposed between said driving surfaces for selective engagement and disengagement therewith in accordance with the pivotal position of the corresponding said arm, a cam device engaging the sleeve members of said arms for supporting them to control their pivotal positions in accordance with their rotary positions, said cam being designed to maintain each arm in a non-rotating position at a first of said work positions, in a position to be rotated by one of said annular driving surfaces in a second of said work positions and in a position to be driven by the other said driving surface while in a third work position, means for supporting an article to be coated on the outer end of each arm for rotation by the shaft thereof, and means at said second work position for spraying coating material on an article supported thereat.

EUGENE H. FISCHER.